(12) United States Patent
Wu et al.

(10) Patent No.: US 12,260,185 B2
(45) Date of Patent: Mar. 25, 2025

(54) COARSE-TO-FINE ABSTRACTIVE DIALOGUE SUMMARIZATION WITH CONTROLLABLE GRANULARITY

(71) Applicant: Salesforce, Inc., San Francisco, CA (US)

(72) Inventors: Chien-Sheng Wu, Mountain View, CA (US); Wenhao Liu, Redwood City, CA (US); Caiming Xiong, Menlo Park, CA (US); Linqing Liu, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 53 days.

(21) Appl. No.: 17/159,625

(22) Filed: Jan. 27, 2021

(65) Prior Publication Data

US 2022/0108086 A1    Apr. 7, 2022

Related U.S. Application Data

(60) Provisional application No. 63/087,024, filed on Oct. 2, 2020.

(51) Int. Cl.
*G06F 40/56* (2020.01)
*G06F 40/205* (2020.01)

(52) U.S. Cl.
CPC ............ *G06F 40/56* (2020.01); *G06F 40/205* (2020.01)

(58) Field of Classification Search
CPC .............................. G06F 40/56; G06F 40/205
(Continued)

(56) References Cited

U.S. PATENT DOCUMENTS 10,977,258 B1 *   4/2021   Liu .................... G06N 5/027
11,314,790 B2 *   4/2022   Chang ............. G06F 16/24564
(Continued)

FOREIGN PATENT DOCUMENTS

CN    111651996    *   3/2019   ............... G06N 3/08
CN    111651996 A1 *   3/2019
(Continued)

OTHER PUBLICATIONS

Devlin et al., "BERT: Pre-training of deep bidirectional transformers for language understanding", arXiv preprint arXiv:1810.04805, Oct. 11, 2018, 14 pages.
(Continued)

*Primary Examiner* — Maikhanh Nguyen
(74) *Attorney, Agent, or Firm* — Haynes and Boone, LLP

(57) ABSTRACT

Dialogue summarization is challenging due to its multi-speaker standpoints, casual spoken language style, and limited labelled data. The embodiments are directed to a coarse-to-fine dialogue summarization model that improves abstractive dialogue summarization quality and enables granular controllability. A summary draft that includes key words for turns in a dialogue conversation history is created. The summary draft includes pseudo-labelled interrogative pronoun categories and noisy key phrases. The dialogue conversation history is divided into segments. A generate language model is trained to generate a segment summary for each dialogue segment using a portion of the summary draft that corresponds to at least one dialogue turn in the dialogue segment. A dialogue summary is generated using the generative language model trained using the summary draft.

20 Claims, 6 Drawing Sheets

(58) Field of Classification Search
USPC .......................................................... 704/9
See application file for complete search history.

(56) References Cited

U.S. PATENT DOCUMENTS

| | | | | |
|---|---|---|---|---|
| 2014/0036022 | A1* | 2/2014 | Croen | H04N 7/147 |
| | | | | 348/14.01 |
| 2019/0325066 | A1* | 10/2019 | Krishna | G06N 3/08 |
| 2019/0327103 | A1* | 10/2019 | Niekrasz | G10L 15/26 |
| 2022/0030110 | A1* | 1/2022 | Khafizov | H04M 3/2218 |

FOREIGN PATENT DOCUMENTS

| | | | | |
|---|---|---|---|---|
| CN | 111651996 A | * | 9/2020 | |
| WO | WO-2021108056 A1 | * | 6/2021 | G10L 15/05 |

OTHER PUBLICATIONS

Dong et al., "Unified Language Model Pre-training for Natural Language Understanding and Generation", 33rd Conference on Neural Information Processing Systems (NeurIPS 2019), Vancouver, Canada, 2019, 13 pages.

Fan et al., "Controllable Abstractive Summarization", In Proceedings of the 2nd Workshop on Neural Machine Translation and Generation, Melbourne, Australia, Jul. 20, 2018, pp. 45-54.

Gliwa et al., "SAMSum Corpus: A Human-annotated Dialogue Dataset for Abstractive Summarization", In Proceedings of the 2nd Workshop on New Frontiers in Summarization, Hong Kong, China, Nov. 4, 2019, pp. 70-79.

Goo et al., "Abstractive Dialogue Summarization With Sentence-Gated Modeling Optimized by Dialogue Acts", In 2018 IEEE Spoken Language Technology Workshop (SLT), Sep. 29, 2018, 8 pages.

Hermann et al., "Teaching Machines to Read and Comprehend", In Advances in neural information processing systems, 2015, 9 pages.

Kitaev et al., "Constituency Parsing with a Self-Attentive Encoder", In Proceedings of the 56th Annual Meeting of the Association for Computational Linguistics (Long Papers), Melbourne, Australia, Jul. 15-20, 2018, pp. 2676-2686.

Lewis et al., "BART: Denoising Sequence-to-Sequence Pre-training for Natural Language Generation, Translation, and Comprehension", arXiv preprint arXiv:1910.13461, Oct. 29, 2019, 10 pages.

Liu et al., "Controlling Length in Abstractive Summarization Using a Convolutional Neural Network", In Proceedings of the 2018 Conference on Empirical Methods in Natural Language Processing, Brussels, Belgium, Oct. 31-Nov. 4, 2018, pp. 4110-4119.

McCowan et al., "The AMI Meeting Corpus", Proceedings of Measuring Behavior 2005, 5th International Conference on Methods and Techniques in Behavioral Research, 2005, 4 pages.

Nallapati et al., "Abstractive Text Summarization using Sequence-to-sequence RNNs and Beyond", Proceedings of the 20th SIGNLL Conference on Computational Natural Language Learning (CoNLL), Berlin, Germany, Aug. 7-12, 2016, pp. 280-290.

Narayan et al., "Don't Give Me the Details, Just the Summary! Topic-Aware Convolutional Neural Networks for Extreme Summarization", In Proceedings of the 2018 Conference on Empirical Methods in Natural Language Processing, Brussels, Belgium, Oct. 31-Nov. 4, 2018, pp. 1797-1807.

Nikolov et al., "Data-driven Summarization of Scientific Articles", arXiv preprint arXiv:1804.08875, Apr. 24, 2018, 8 pages.

Qazvinian et al., "Scientific Paper Summarization Using Citation Summary Networks", In Proceedings of the 22nd International Conference on Computational Linguistics (Coling 2008), Manchester, Aug. 2008, pp. 689-696.

Radford et al., "Language Models are Unsupervised Multitask Learners", 2019, 24 pages.

Ratner et al., "Training Complex Models with Multi-Task Weak Supervision", The Thirty-Third AAAI Conference on Artificial Intelligence (AAAI-19), 2019, pp. 4763-4771.

Saito et al. "Length-controllable Abstractive Summarization by Guiding with Summary Prototype", arXiv preprint arXiv:2001.07331, Jan. 21, 2020, 8 pages.

See et al., "Get To The Point: Summarization with Pointer-Generator Networks" arXiv preprint arXiv:1704.04368, Apr. 25, 2017, 20 pages.

Wolf et al., "TransferTransfo: A Transfer Learning Approach for Neural Network Based Conversational Agents", In 32nd Conference on Neural Information Processing Systems (NeurIPS 2018), Montréal, Canada, 2018, 6 pages.

Wu et al., "TOD-BERT: Pre-trained Natural Language Understanding for Task-Oriented Dialogue", Proceedings of the 2020 Conference on Empirical Methods in Natural Language Processing, Nov. 16-20, 2020, pp. 917-929.

Yang et al., "XLNet: Generalized Autoregressive Pretraining for Language Understanding", In 33rd Conference on Neural Information Processing Systems (NeurIPS 2019), Vancouver, Canada, 2019, 11 pages.

Zhang et al., "PEGASUS: Pre-training with Extracted Gap-sentences for Abstractive Summarization", In Proceedings of the 37 th International Conference on Machine Learning, Online, PMLR 119, 2020, 12 pages.

Zhang et al., "Neural Latent Extractive Document Summarization", In Proceedings of the 2018 Conference on Empirical Methods in Natural Language Processing, Brussels, Belgium, Oct. 31-Nov. 4, 2018. pp. 779-784.

Zhang et al., "DialoGPT: Large-Scale Generative Pre-training for Conversational Response Generation", In Proceedings of the 58th Annual Meeting of the Association for Computational Linguistics, Jul. 5-Jul. 10, 2020, pp. 270-278.

* cited by examiner

| | |
|---|---|
| Morgan | <hl> Hey gorgeous, what's up? |
| Suzanne | Nothing special, it's just one of many boring days at work. But's better now tho! |
| Morgan | Are you working at all ? |
| Suzanne | I'm trying but you aren't helping me, at all. I'm just taking a well-deserved break </hl> |
| Morgan | <hl> I miss you Suzie |
| Suzanne | I miss you too Morgan |
| Morgan | Do you feel like going to a concert next week? maroon 5 is playing at the hulu theater at madison square garden .. as it happens , I've got two tickets. do you want to go ? </hl> |
| Suzanne | <hl> Really? OMG! That's wonderful !. Thank you sweetheart! |
| Morgan | Oh, nothing. I just want you to be happy :) </hl> |

| Turn | Intent | Key Phrase |
|---|---|---|
| 1 | what | |
| 2 | abstain | "'s just one of many boring days at work" |
| 3 | confirm | "working at all" |
| 4 | abstain | "'m just taking a well-deserved break" |
| 5,6 | abstain | |
| 7 | confirm | "feel like going to a concert next week", "maroon 5", "is playing at the hulu theater at madison square garden" |
| 8 | why | |
| 9 | abstain | |

Summary: Suzanne is at work and is having a break now. Morgan invites Suzanne to a concert of Maroon 5 which takes place next week at the Hulu Theatre at Madison Square Garden. Suzanne agrees.

FIG. 3

COARSE-TO-FINE ABSTRACTIVE DIALOGUE SUMMARIZATION WITH CONTROLLABLE GRANULARITY

CROSS-REFERENCE To RELATED APPLICATIONS

This application is a nonprovisional of and claims priority under 35 U.S.C. 119 to U.S. Provisional Application No. 63/087,024, filed Oct. 2, 2020, which is hereby expressly incorporated by reference herein in its entirety.

TECHNICAL FIELD

The embodiments relate generally to summarization, and more particularly to summarizing dialogues.

BACKGROUND

Text summarization tasks distill the most important information in text to produce an abridged version or summary. Abstractive summarization, for example, requires neural generative models with high level of semantic understanding because the output words do not necessarily appear in the source text. Generating abstractive summation is more challenging but gives much flexibility to the summary compared to the extractive summarization. In the abstractive dialogue summarization, the size and quality of labeled data is one of the bottlenecks. Also, collecting summary is costly and subjective. The AMI corpus, for example, has only 141 summaries, and the largest dialogue summarization dataset SAMSum has only 14,732 training samples, which is roughly five percent of the commonly used text summarization dataset CNN/DailyMail. Due to the shortage of labeled data, dialogue summarization has not received much attention despite the prevalence of dialogues (e.g. text messages, electronic mails, social media, etc.) and the vast application potential of dialogue summarization systems.

Dialogue summarization presents unique challenges. A style of a dialogue is different from structured text, such as articles where the title and the first few sentences usually contain the most useful information. A dialogue is a conversation, and a conversation often involves multiple speakers that may have different points of view. The natural language style of a conversation is also different from a standard writing style. For example, conversational data has more abbreviations and typos, and unlike structured text, the important information may be scattered.

The ability to control text summarization in the news domain has been gradually attracting more attention. Some conventional systems focus on learning length embeddings to control summary lengths. However, the length information is only added during the decoding stage, making the encoding stage less informed. Other conventional system initially extract a "prototype" text span in a desired length and then paraphrase the extracted text span as the output summary. In these systems the retrieve-and-rewrite process is restricted by the extraction quality, leaving its performance limited by the capabilities of extractive solutions.

BRIEF DESCRIPTION OF THE DRAWINGS

FIG. 3 is a diagram of a dialogue conversation history, a summary draft of the dialogue conversation history, and a dialogue summary, according to some embodiments.

In the figures, elements having the same designations have the same or similar functions.

DETAILED DESCRIPTION

The embodiments are directed to a coarse-to-fine abstractive dialogue summarization neural network model or CorDial that is equipped with granular controllability. Initially, the CorDial model creates a summary draft that contains user intent information and important key phrases, if any, that may appear in the summary for each dialogue turn. This summary draft may be prefixed to the human-annotated summary while finetuning a summary generator. The summary draft provides some weak supervision because the final summary is conditioned on the generated summary draft.

The embodiments are also directed to a CorDial model that is trained to clip the dialogue text with special tokens. The CorDial model then matches each summary sentence to its corresponding clipped dialogue context in the dialogue text. In this way, the CorDial model generates a single sentence for each clipped dialogue context. Clipping dialogue text enables the CorDial model to generate a dialogue summary at different granularity by highlighting arbitrary numbers of text spans from a dialogue. This also makes the dialogue summary more interpretable.

In some embodiments, the CorDial model is built on top of another language model, such as a BART language model, that is pre-trained with unsupervised denoising objectives and fine-tuned on the News summarization corpus XSUM.

As used herein, the term "network" or "model" may comprise any hardware or software-based framework that includes any artificial intelligence network or system, neural network or system, and/or any training or learning models implemented thereon or therewith.

As used herein, the term "module" may comprise hardware or software-based framework that performs one or more functions. In some embodiments, the module may be implemented on one or more neural networks.

Figure 1:
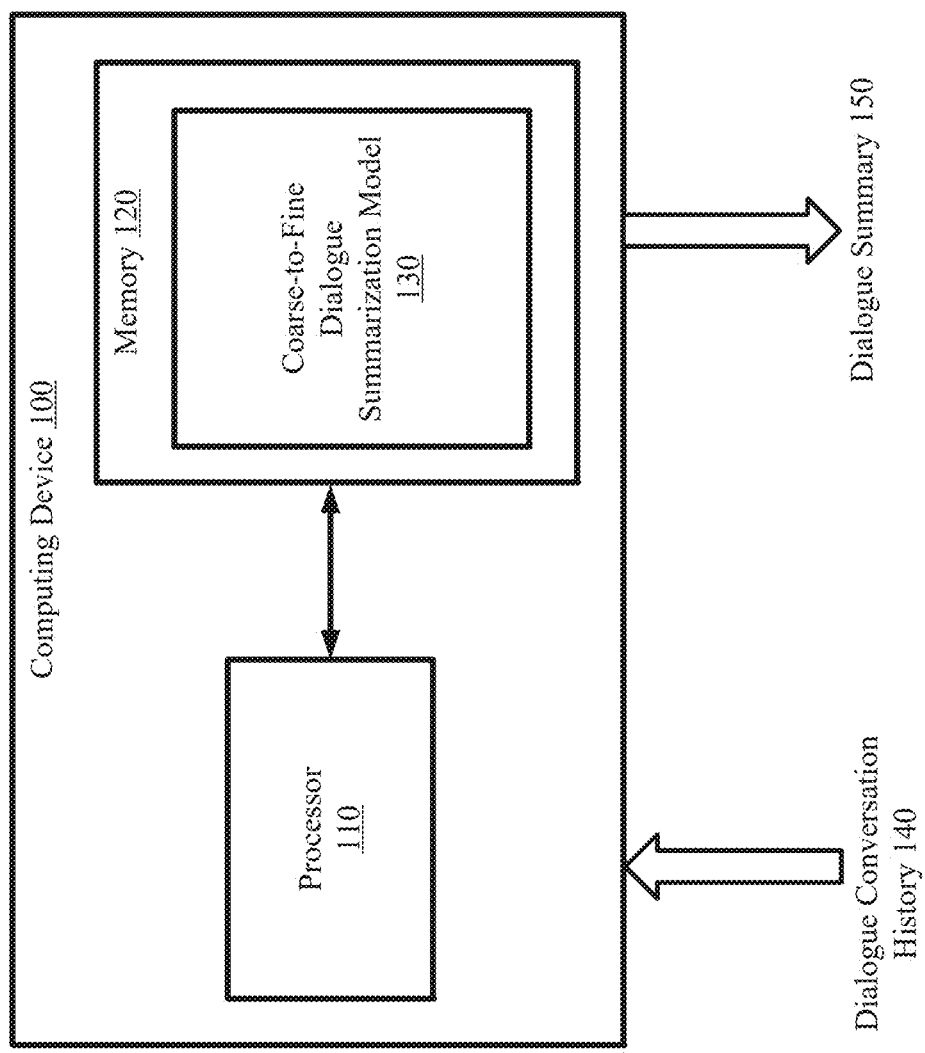
FIG. 1 is a simplified diagram of a computing device where the embodiments can be implemented.

FIG. 1 is a simplified diagram of a computing device 100, according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include a non-transitory, tangible, machine readable media that includes executable code that when run by one or more processors (e.g., processor 110) may cause the one or more processors to perform the methods described in further detail herein. For example, as shown, memory 120 includes instructions for a coarse-to-fine abstractive dialogue summarization model 130 or (CorDial model 130). CorDial model 130 may be a neural network that includes one or more networks or modules and/or pre-trained language models that perform natural language processing tasks. CorDial model 130 may receive input, such as a dialogue conversational history 140 and generate output which may be a dialogue summary 150 of dialogue conversational history 140. Dialogue conversational history 140 may include multiple dialogue turns that occurred in a dialogue between one or more speakers. Each dialogue turn corresponds to an utterance made by one speaker before an utterance is made by another speaker. In some embodiments, dialogue conversational history 140 may be defined as $D=\{X_1, X_2, \ldots, X_N\}$ where each $X_i$ is a sequence of words in a dialogue turn and N is a total number of dialogue turns. In some instances, dialogue conversation history 140 may include more than two speakers, each speaker speaking during a corresponding dialogue turn. The dialogue summary 150 may be defined as an M-sentence dialogue summary $Y=\{Y_1, Y_2, \ldots, Y_M\}$ that summarizes dialogue conversation history 140, but that is typically more brief than the overall dialogue conversation history 140.

Figure 2A:
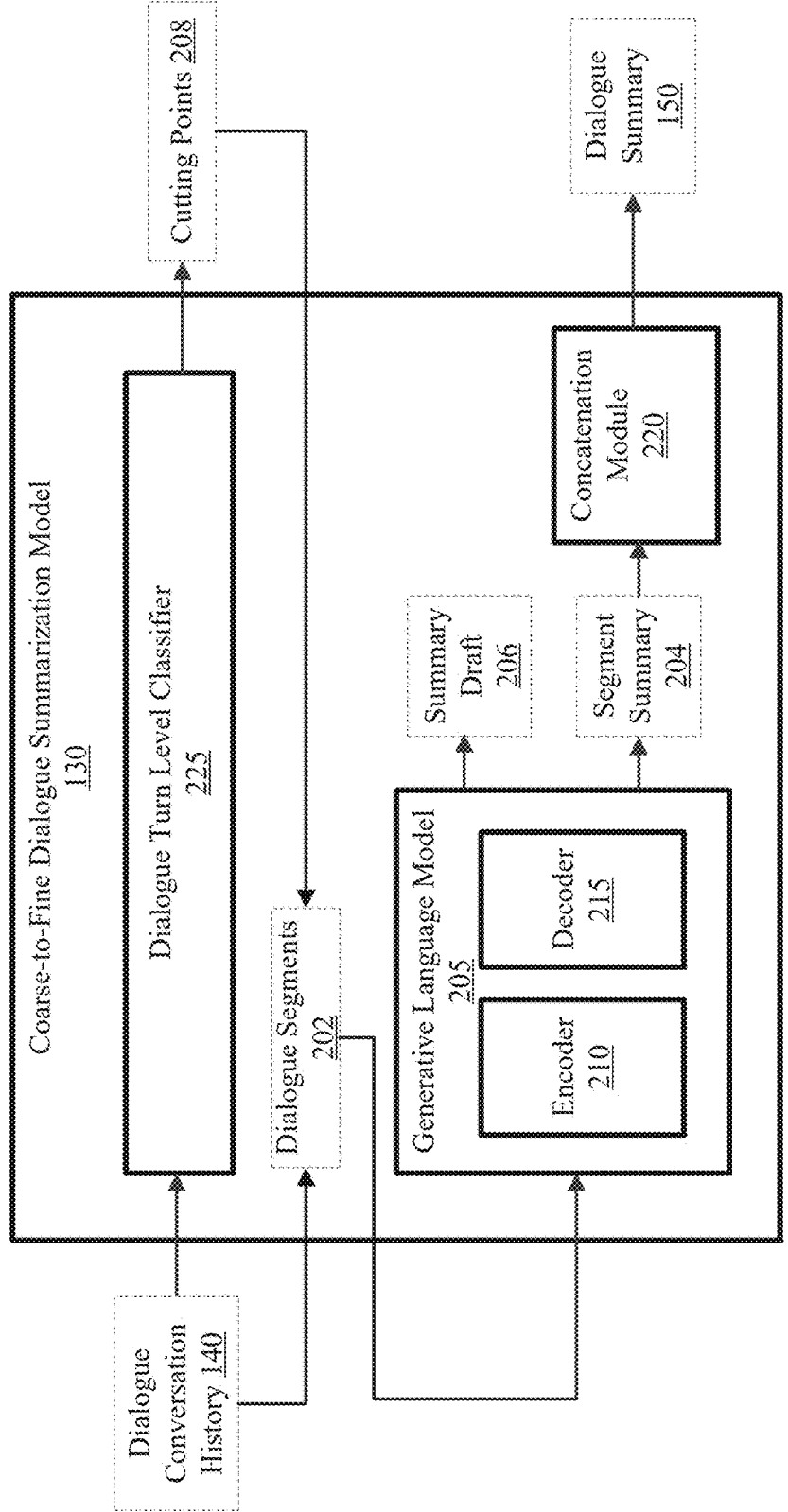
FIG. 2A and 2B are block diagrams of a coarse-to-fine dialogue summarization model, according to some embodiments.
Figure 2B:
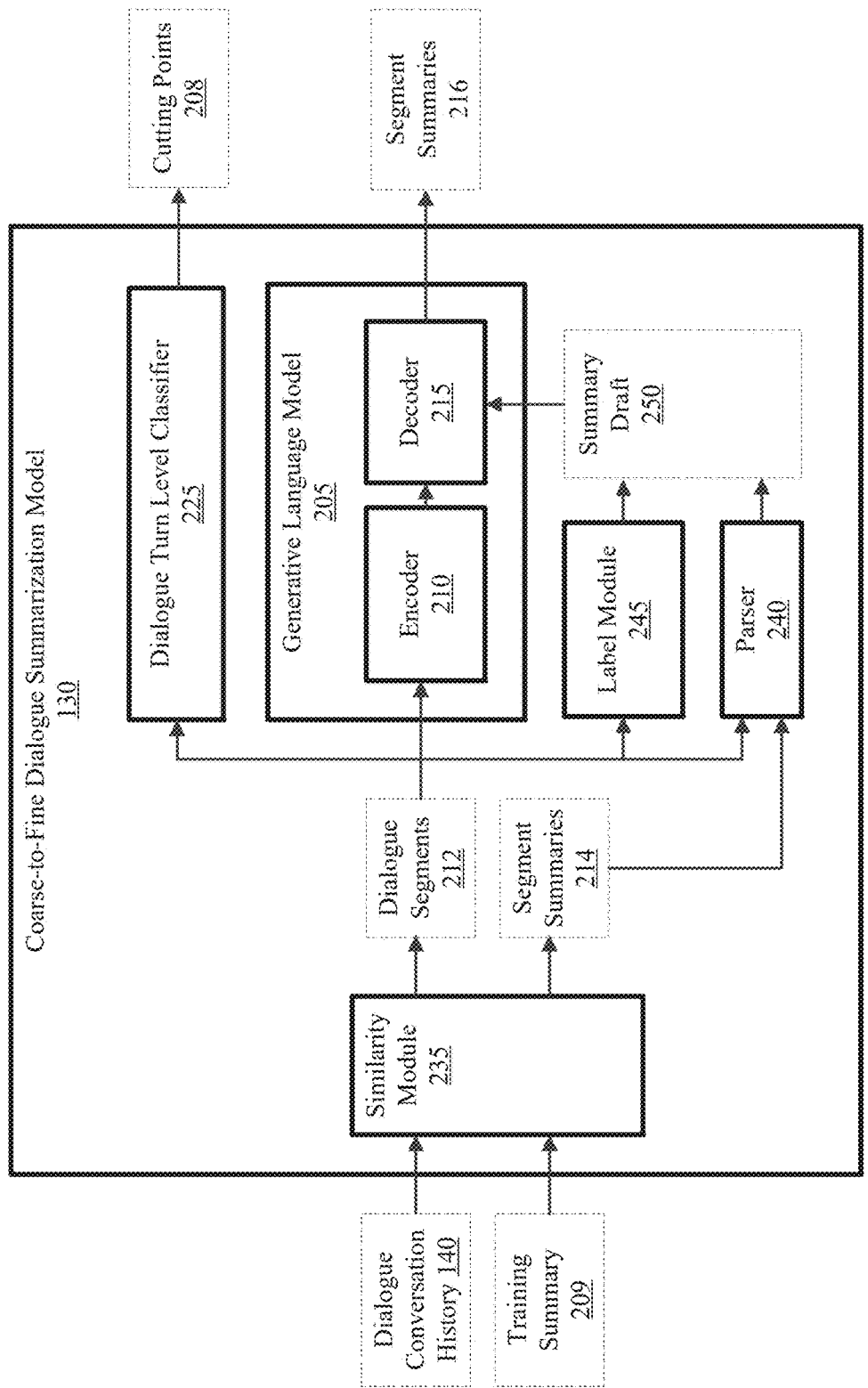

FIGS. 2A and 2B are block diagrams 200A and 200B of a CorDial model, according to some embodiments. FIG. 2A illustrates the CorDial model 130 in an inference stage where a trained CorDial model 130 receives dialogue conversational history 140 and generates a dialogue summary 150 which is a summary of the dialogue conversational history 140. In some embodiments, CorDial model 130 may include a pre-trained generative language model 205, such as BART-xsum, which may be pre-trained using unsupervised denoising objectives and further fine-tuned using News summarization corpus XSUM. The generative language model 205 structure may be based on a transformer architecture which includes an autoencoder that is divided into encoder 210 and decoder 215. The encoder 210 may receive dialogue conversational history 140 and generate encodings. Decoder 215 may receive the encodings and generate dialogue summary 150.

In some embodiments, generative language model 205 may receive dialogue conversation history 140 that is divided into dialogue segments 202. Each dialogue segment 202 is a segment of dialogue conversation history 140, and may include one or more dialogue turns. The number of dialogue segments 224 may correspond to the number of sentences that CorDial model 130 may generate for dialogue summary 150. When generative language model 205 receives dialogue segment 202, encoder 210 may generate segment encodings. Decoder 215 may receive and convert the segment encodings into a corresponding segment summary 204. Segment summary 204 may include one sentence that summarizes dialogue segment 202 in some embodiments. Concatenation module 220 may receive segment summaries 204 that decoder 215 generates from multiple dialogue segments 202 and concatenates multiple segment summaries 204 into dialogue summary 150. In some embodiments, concatenation module 220 may concatenate the segment summaries 204 associated with dialogue conversation history 140 linearly, that is in the order that generative language model 205 generates the segment summaries.

In some embodiments, encoder 210 of generative language model 205 may also generate summary draft 206. The summary draft 206 may be used to train generative language model 205 as discussed in FIG. 2B, but may be discarded during the inference stage discussed in FIG. 2A.

In some embodiments, CorDial model 130 may include a dialogue-turn-level classifier 225. Dialogue-turn-level classifier 225 may be trained to identify dialogue segments 202 in dialogue conversation history 140 by determinizing cutting points 208 between two dialogue turns in dialogue conversation history 140. Each cutting point 208 separates two dialogue segments 202 in dialogue conversation history 140.

Special highlighting tokens may be inserted into dialogue conversation history 140 at the identified cutting points 208 to indicate to generative language model 205 different dialogue segments 202 during the inference stage. Generative language model 205 may then generate segment summary 204, for each dialogue segment 202 indicated by the special highlighting tokens. Concatenation module 220 may then concatenate the segment summaries 204 into dialogue summary 150 as discussed above.

In some embodiments, dialogue conversation history 140 may be manually divided into dialogue segments 202. That is, CorDial model 130 may receive user input that divides dialogue conversation history 140 into dialogue segments 202 by inserting highlighting tokens into dialogue conversation history 140.

To generate dialogue summary 150, the CorDial model 130 may be trained. Unlike conventional dialogue summarization models, generative language model 205 of CorDial model 130 may be trained using a summary draft. Further dialogue turn level classifier 225 may be trained to identify cutting points 208. FIG. 2B includes a structure of CorDial model 130 that includes various training components, according to some embodiments. As illustrated in FIG. 2B, CorDial model 130 may be trained using a similarity module 235, parser 240 and label module 245, each of which may be or include a neural network.

Similarity module 235 may receive dialogue conversation history 140 and training summary 209. Training summary 209 may be a known summary for dialogue conversation history 140 that may be used to train CorDial model 130. Training summary 209 and dialogue summary 150 that may be determined during the inference stage may or may not include the same text or be the same summaries.

Similarity module 235 may divide dialogue conversation history 140 into dialogue segments 212 and training summary 209 into segment summaries 214. To divide dialogue conversation history 140 into dialogue segments 212 and training summary 209 into segment summaries 214, similarity module 235 may include a similarity function, e.g. ROUGE-1 function. Similarity module 235 may divide dialogue conversation history 140 into M dialogue segments 212, such that one dialogue segment 212 corresponds to one segment summary 214. In an embodiment where M=1, the dialogue conversation history 140 may be dialogue segment 212 and segment summary 214 may be training summary 209. In some embodiments, similarity function may match dialogue segment 212 with segment summary 214 by finding the dialogue segment that has the highest ROUGE score to one of the tested summary sentences in training summary 209. The cutting point may be determined as follows:

$$t_m = \arg\max_t \text{SIM}(X_{c_m:t}, Y_m) \quad \text{Equation 1}$$

where SIM may be a similarity function, e.g. ROUGE-1, $c_m$ may be the accumulated turn index ($c_0=1$ and $c_m=t_{m-1}$) that indicates a part of dialogue conversation history 140 that has been covered by a summary sentence, and $t_m$ is the cutting point in the dialogue conversation history 140 for the $m^{th}$ summary sentence.

In some embodiments, parser 240 and label module 245 may receive dialogue segments 212 and/or segment summaries 214 generated from dialogue conversation history 140 and training summary 209 and create a summary draft 250. Summary draft 250 may provide useful weak supervision that may be beneficial to the final summarization task that occurs in generative language model 205. The summary draft 250 may include turn indexes that correspond to a dialogue turns in dialogue conversation history 140, labels for action categories associated with the dialogue turns, and zero or more key phrase(s) associated with the dialogue turns.

In some embodiments, label module 245 may be a neural network. Label module 245 may assign labels using a Snorkle network. Specifically, label module 245 may receive dialogue segments 212 from dialogue conversation history 140 and assign a label for action category for each dialogue turn in dialogue conversation history 140. Action categories may correspond to interrogative pronouns. In some embodiments, label module 245 may include a set of interrogative pronoun categories, and then assign an action label to each dialogue turn with its action category by a weakly-supervised labelling. The interrogative pronoun categories may be designed to identify functional units of all utterances, serving as the logic of the dialogue. Example action categories may be as follows:

WHY: ask the reason of the state mentioned in the previous turn, e.g., "why" or "why not?"
WHAT: request more details about the aforementioned object; the sentence usually starts with "what's" or "what about."
WHERE: ask the location of an appointment or event.
WHEN: ask the time of an appointment or event, e.g. "when?" or "what time?"
CONFIRM: ask the other speaker to establish the correctness of certain case; the sentence usually starts with patterns like "are you?", "will you," or "has he"?
ABSTAIN: the utterance does not belong to any of the previous categories; this happens when speakers continue to state or comment without seeking for more information from the others.

Notably, training CorDial model 130 by assigning labels that are action categories is different from the conventional task-oriented dialogue systems which have clear and annotated intents (e.g., book flight and check account) and actions (e.g., inform and request).

In some embodiments, parser 240 may determine key phrases in dialogue conversation history 140. Parser 240 may be a neural network and may be a constituency parser. Parser 240 may receive dialogue segment 212 from dialogue conversation history 140 and segment summaries 214 from training summary 209. In some embodiments, parser 240 may parse each dialogue turn in dialogue segments 212 and each segment summary 214 in training summary 209 into one or more parsing trees. Parser 240 may then identify the longest common sub-sequence, if any, in the parsing trees between each dialogue turn in dialogue segments 212 and each segment summary in segment summaries 214. If parser 240 identifies the longest common sub-sequence, the longest common sub-sequence becomes a key phrase or key phrase (s) for the dialogue turn. The key phrase(s) are included in summary draft 250 next to the label for action category for the corresponding dialogue turn. Notably, not every dialogue turn may contain key phrases, in which case the key phrase in summary draft 250 may be left empty or blank.

FIG. 3 is a diagram 300 of an example dialogue conversation history, summary draft, and dialogue summary, according to some embodiments. Specifically, FIG. 3 illustrates dialogue conversation history 140 that includes a dialogue between two participants: Morgan and Suzanne, over nine dialogue turns. The first dialogue turn begins with Morgan stating "Hey gorgeous, what's up?" In the seventh dialogue turn, participant Morgan asks "Do you feel like going to a concert next week? . . . " In the eighth dialogue turn, participant Suzanne responds with "Really? OMG! That's wonderful! Thank you sweetheart!"

FIG. 3 also illustrates summary draft 250. Summary draft 250 corresponds to dialogue conversation history 140 shown in FIG. 3. Summary draft 250 includes dialogue turns indexed using turn index 302. Because there are nine turns in dialogue conversation history 140 there are nine turn indexes 302. As discussed above, summary draft 250 includes labels for action categories 303 and key phrase(s) 305 for each dialogue turn. The labels for action categories 303 shown in FIG. 3 include interrogative pronoun, such as WHY, WHAT, CONFIRM, and ABSTAIN. Further, FIG. 3 illustrates that dialogue turns corresponding to turn indexes 1, 5, 6, 8, and 9 may not have key phrase(s) 305.

In some embodiments, CorDial model 130 may construct the summary draft 250 as a concatenated string that includes a sequence of turn indexes 302, action categories 303, and key phrase(s) 305 for each dialogue turn. The string may end with a special token "TLDR." With reference to FIG. 3, the summary draft 250 may be "1 what 2 abstain 's just one of . . . square garden' 8 why 9 abstain TLDR".

Going back to FIG. 2B, summary draft 250 may be used to train CorDial model 130. As discussed in FIG. 2A, CorDial model 130 includes encoder 210 and decoder 215. During training, encoder 210 may receive dialogue segments 212 and generates encodings from dialogue segments 212. Decoder 215 may receive the encodings generated by encoder 210, labels for action categories 303 and key phrase(s) 305 from summary draft 250 that correspond to turns in dialogue segments 212. Using the encodings, labels for action categories 303 and key phrase(s) 305, decoder 215 may generate segment summaries 216. Typically, there may be one segment summary 216 for one dialogue segment 212.

The training process may repeat for multiple iterations using different dialogue conversation histories 140 and training summaries 209 until generative language model 205 is trained. Once trained, generative language model 205 may generate dialogue summary 150 from dialogue conversation history 140. An example dialogue summary 150 is shown in FIG. 3.

In some embodiments, CorDial model 130 may be trained to control a number of sentences that may be included in dialogue summary 150. In other words, during the inference stage discussed in FIG. 2A, CorDial model 130 may generate a single sentence summary as dialogue summary 150 or divide dialogue conversation history 140 into multiple dialogue segments 202 and generate a segment summary 204 as an output for each dialogue segment 202. If the dialogue conversation history 140 is divided into dialogue segments 202, the number of output sentences in dialogue summary 150 may be the same as the number of dialogue segments 202.

In some embodiments, during inference and training stages discussed in FIGS. 2A and 2B, dialogue segments 202, 212 in the dialogue conversation history 140 may be identified by inserting special tokens <hl> and </hl> into dialogue conversation history 140. The dialogue conversation history 140 example in FIG. 3 illustrates three dialogue segments. The first dialogue segment 304 is between special tokens 310S and 310E, the second dialogue segment 306 is between special tokens 312S and 312E, and the third dialogue segment 308 is between special tokens 314S and 314E. The number of segments may correspond to a number of sentences that may be included in dialogue summary 150. For example, when dialogue conversation history 140 is divided into three dialogue segments, as shown in FIG. 3, CorDial model 130 may generate a three-sentence summary, where the first segment summary 316 corresponds to the first dialogue segment 304, the second segment summary 318 corresponds to the second dialogue segment 306, and the third summary sentence 320 corresponds to the third dialogue segment 308. In another example, an entire dialogue conversation history 140 may be a single segment that is augmented with a single pair of highlighting tokens. For example, the single segment may be between special tokens 310S and 314E. This results in a single segment summary (not shown) that is dialogue summary 150.

In some embodiments, CorDial model 130 may be trained to control the number of dialogue segments 202 that may be generated from dialogue conversation history 140. Because the number of dialogue segments 202 corresponds to the number of sentences in dialogue summary 150, increasing the number of dialogue segments 202 increases the number of segment summaries, while decreasing the number of dialogue segments 202 decreases the number of segment summaries. In this way, CorDial model 130 may generate the dialogue summary 150 that is more interpretable.

As discussed above, CorDial model 130 may include dialogue turn level classifier 225. Dialogue turn level classifier 225 may be trained to identify dialogue segments 202 in dialogue conversation history 140 during the inference state discussed in FIG. 2A. During the training stage, dialogue turn level classifier 225 may be trained to determine where to place special tokens <hl> and </hl> in dialogue conversation history 140. To determine where to place special tokens <hl> and </hl>, dialogue turn level classifier 225 may receive dialogue segments 212 and may predict whether each dialogue turn is a cutting point 208. Cutting point 208 indicates where one dialogue segment ends and the next dialogue segment begins. With reference to FIG. 3, a cutting point may be between dialogue turns 4 and 5, where CorDial model 130 may insert special tokens 310E and 213S. Another cutting point may be between dialogue turns 7 and 8 where CorDial model 130 may insert special tokens 312ES and 314S.

In some instances, dialogue turn level classifier 225 may be a binary classifier. Specifically, dialogue-turn-level classifier 225 may be trained to receive dialogue segments 212 as input and predict whether each dialogue turn is a cutting point 208. During training, each dialogue turn in dialogue segments 212 that make up dialogue conversation history 140 may be prefixed with a separation token (e.g., $x_{sep}$=<s>) and turned into a long sequence. Dialogue turn level classifier 225 may receive this long sequence and process the long sequence as follows:

$$H = C([x_{sep}, X_1, x_{sep}, X_2, \ldots, x_{sep}, X_N]) \in \mathbb{R}^{N \times d_{emb}},$$
$$\hat{P} = \text{sigmoid}(W_1(H)) \in \mathbb{R}^N \qquad \text{Equation 2}$$

where C is dialogue level turn classifier 225, H is the output of the dialogue level turn classifier 225 and may include representation of the separation tokens, and each of the separation tokens is a $d_{emb}$ dimension vector, and $W_1 \in \mathbb{R}^{d_{emb} \times 1}$ is a trainable linear mapping. The P is a predicted segment probability that is trained with a binary cross-entropy loss. In some embodiments, a Bidirectional Encoder Representations from Transformers (BERT)-base model may be used as dialogue level turn classifier 225. In some embodiments, the dialogue turn level classifier 225 may not need to be perfect because the labels may contain a certain noise. In some embodiments, that final ROUGE score produced by similarity module 235 may be similar for both "oracle" dialogue split and predicted dialogue split. The number of output summary sentences may be controlled by controlling the number of predicted dialogue splits. For example, if there is a three-sentence summarization 150 as shown in FIG. 3, the dialogue may be split into three dialogue segments by selecting the top two highest segment probabilities in $\hat{P}$. Further, one segment summary may be generated by ignoring the segment classifier and clipping the whole dialogue with special tokens.

In some embodiments, CorDial model 130 may be trained using an "oracle" dialogue segmentation that adds highlighting tokens for each summary sentence, separately. For each summary sentence, CorDial model 130 may receive an entire dialogue conversation history 140 with a highlighted portion as input. From the dialogue conversation history 140, CorDial model 130 may be trained to generate a corresponding summary draft 250 and segment summaries 216, which may be segment summaries 316, 318, and 320 of FIG. 3. For example, for the first segment summary, such as segment summary 316, CorDial model 130 may receive the whole dialogue conversation history 140 with the added highlighting tokens both in the beginning of turn one and in the end of the turn four. CorDial model 130 may then generate output that contains summary draft 250 from turn one to turn four and the first segment summary 316 that is "Suzanne is at work and is having a break now." The CorDial model 130 is also trained on cross-entropy loss for the generated tokens.

Figure 4:
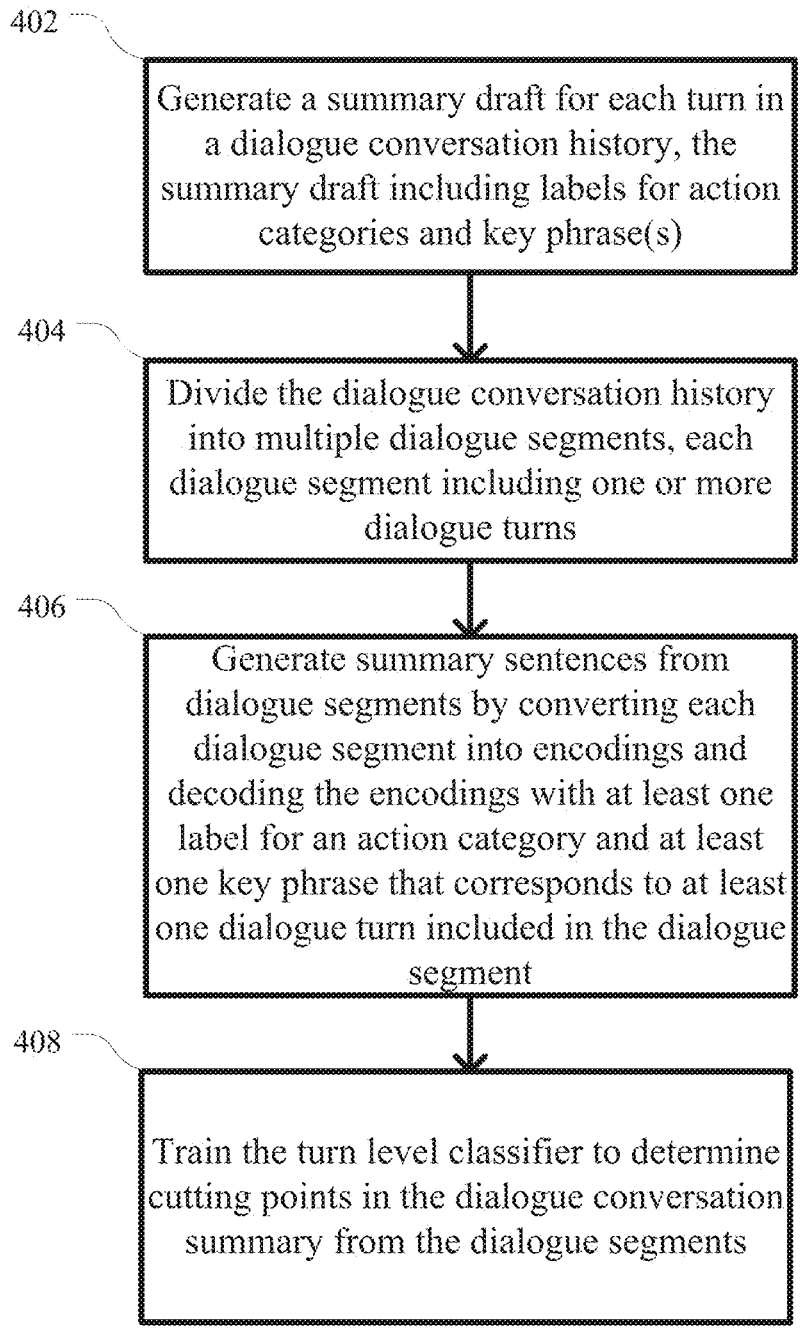
FIG. 4 is a flowchart of method for training a coarse-to-fine summarization model, according to some embodiments.

FIG. 4 is a simplified diagram of a method 400 for training a CorDial model 130 to generate a dialogue summary from a dialogue, according to some embodiments. One or more of the processes 402-408 of method 400 may be implemented, at least in part, in the form of executable code stored on non-transitory, tangible, machine-readable media that when run by one or more processors may cause the one or more processors to perform one or more of the processes 402-408.

At process 402, dialogue conversation history is divided into dialogue segments. For example, similarity module 235 may divide dialogue conversation history 140 into dialogue segments 212 using on training summary 209. Training summary 209 may also be divided into segment summaries 214, such that one dialogue segment 212 corresponds to one segment summary 214.

At process 404, a summary draft is generated. For example, CorDial model 130 may generate a summary draft 250 from dialogue segments 212 in dialogue conversation history 140. The summary draft 250 includes a turn index for each dialogue turn in dialogue conversation history 140. For each dialogue turn, the summary draft 250 also includes a label for an action category and zero or more key phrase(s) that correspond to the dialogue turn. As discussed above, parser 240 may generate zero or more key phrase(s) 255 that are associated with the dialogue turn using dialogue segments 212 from dialogue conversation history 140 and segment summaries 214 from training summary 209. As also discussed above, label module 245 may generate a label for action category that is associated with the dialogue turn.

At process 406, segment summaries are generated. For example, generative language model 205 may receive dialogue segments 212. For each dialogue segment in dialogue segments 212, encoder 210 of generative language model 205 may generate encodings. The decoder 215 may receive encodings, labels for action categories and key phrase(s) for dialogue turns included in summary draft 250 and generate segment summary 216 for the dialogue segment 212.

At process 408, dialogue turn level classifier is trained to determined cutting points. For example, dialogue turn level classifier 225 is trained on dialogue segments 212 to determine cutting points 208 in dialogue conversation history 140.

In some embodiments, method 400 may be repeated on multiple dialogue conversation histories 140 and the corresponding training summaries 209, until CorDial model 130 may generate accurate dialogue summaries 150. Once CorDial model 130 is trained, CorDial model 130 may be used in an inference stage to generate dialogue summary 150 from dialogue conversation history 140.

Figure 5:
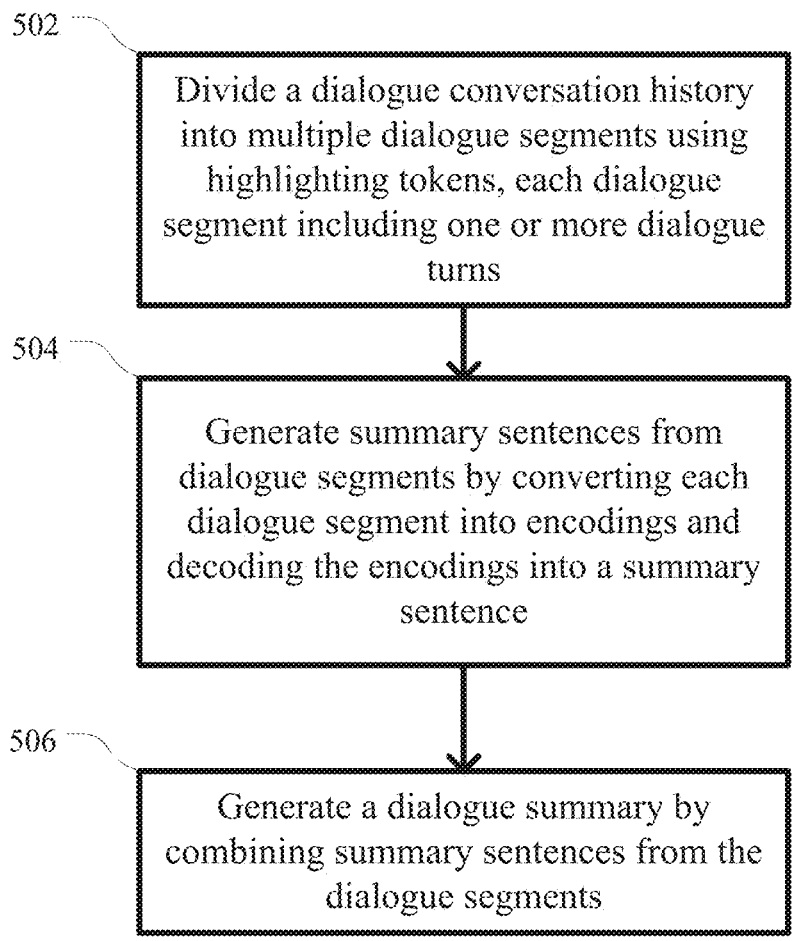
FIG. 5 is a flowchart of a method for determining a dialogue summary with a coarse-to-fine summarization model, according to some embodiments.

FIG. 5 is a simplified diagram of a method 500 for training a CorDial model 130 to generate dialogue summary from a dialogue, according to some embodiments. One or more of the processes 502-506 of method 500 may be implemented, at least in part, in the form of executable code stored on non-transitory, tangible, machine-readable media that when run by one or more processors may cause the one or more processors to perform one or more of the processes 402-408.

At process 502, a dialogue conversation history is divided into multiple dialogue segments. For example, dialogue turn level classifier 225 may divide dialogue conversation history 140 into dialogue segments 202 by identifying cutting points 230 in between dialogue turns. The dialogue turns between the cutting points 208 are in the same dialogue segment 202. In some embodiments, special highlighting tokens may be inserted into dialogue conversation history 140 at the cutting points 208 to identify dialogue segments 202. In other embodiments, computing device 100 may receive input, such as highlighted text in dialogue conversation history 140 that identifies dialogue segments 202 in dialogue conversation history 140. Based on the input, special highlighting tokens may be inserted into dialogue conversation history 140.

At process 504, segment summaries are generated. For example, generative language model 205 trained as discussed in method 400 may receive dialogue conversation history 140 with the highlighting tokens that identify dialogue segments 202. For each dialogue segment 202, that is the portion of dialogue conversation history 140 between the highlighting tokens, encoder 210 of generative language model 205 may generate encodings. The decoder 215 may receive 260 and generate segment summary 204 of the dialogue segment 202.

At process 506, the segment summaries are concatenated into a dialogue summary. For example, concatenation module 220 may combine the segment summaries 204 for the dialogue segments 202 into dialogue summary 150. In some instances, concatenation module 220 may concatenate segment summaries 204 linearly into a dialogue summary 150.

Some examples of computing devices, such as computing device 100 may include non-transitory, tangible, machine readable media that include executable code that when run by one or more processors (e.g., processor 110) may cause the one or more processors to perform the processes of methods 400 and 500. Some common forms of machine readable media that may include the processes of methods 400 and 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for training a neural network model to generate a dialogue summary, comprising:
dividing, using a similarity module executing on a processor, a dialogue conversation history into dialogue segments, wherein dividing the dialogue conversation history into the dialogue segments further comprises:

matching, using the similarity module, a plurality of dialogue segments in a dialogue conversation history against segment summaries associated with a training summary, wherein that matching generates similarity scores;

selecting the dialogue segments from the plurality of dialogue segments that correspond to highest similarity scores from the similarity scores, wherein a dialogue segment in the selected dialogue segments includes including at least one dialogue turn from dialogue turns in the dialogue conversation history;

dividing, using the similarity module, the training summary into training segment summaries based on dialogue turns in the dialogue conversation history, wherein the training summary summarizes the dialogue conversation history;

generating a summary draft from the dialogue segments in a dialogue conversation history and the training segment summaries, wherein the summary draft includes turn indexes corresponding to the dialogue turns, labels for action categories and key phrases associated with a subset of the dialogue turns;

generating, using an encoder of a generative language model executing on the processor, encodings from the dialogue segments; and generating, using a decoder of the generative language model, segment summaries for the dialogue conversation history from the encodings from the dialogue segments and the summary draft.

2. The method of claim 1, wherein the summary draft includes a first turn index, a label for an action category in the labels for the action categories and a key phrase in the key phrases that correspond to a first dialogue turn.

3. The method of claim 1, wherein a label for an action category in the labels for the action categories indicates that there are no interrogative pronouns associated with a dialogue turn in the dialogue turns.

4. The method of claim 1, wherein the summary draft is a concatenation of a first turn index corresponding to a first dialogue turn in the dialogue conversation history, a first label for a first action category in the labels for the action categories that corresponds to the first turn index, a first key phrase in the key phrases that corresponds to the first turn index, a second turn index corresponding to a second dialogue turn in the dialogue turns, a second label for a second action category in the labels for the action categories that corresponds to the second turn index, and a second key phrase in the second key phrases that corresponds to the second turn index.

5. The method of claim 1, wherein the generating the summary draft further comprises:

generating, using a label module, at least one label for the action category in the labels for the action categories from the dialogue conversation history.

6. The method of claim 1, wherein the generating the summary draft further comprises:

generating, using a parser, at least one key phrase in the key phrases associated with a subset of the dialogue turns and a training summary draft.

7. The method of claim 1, further comprising:

training a dialogue turn level classifier, wherein the training comprises:

separating the dialogue turns in the dialogue conversation history with separator tokens;

classifying, using the dialogue turn level classifier, the separator tokens, wherein an output of the classifier are token vectors representing the separator tokens;

determining probabilities of the token vectors;

selecting at least one token vector from the token vectors based on at least one probability in the probabilities;

identifying at least one separator token corresponding to the at least one token vector as at least one cutting point that separates the dialogue segments in the dialogue conversation history; and inserting at least one highlighting token in place of the at least one separator token.

8. The method of claim 7, wherein the at least one probability is above a predefined probability threshold or further comprises selecting the at least one probability that is one of top highest probabilities.

9. The method of claim 1, further comprising:

receiving a selection of a subset of dialogue turns from the dialogue conversation history corresponding to the dialogue segment in the dialogue segments.

10. The method of claim 1, further comprising:

identifying, using a dialogue turn level classifier and the dialogue segments, cutting points in the dialogue conversation history, wherein one cutting point from the cutting points indicates a beginning of a dialogue segment in the dialogue segments and a second cutting point indicates an end of the dialogue segment.

11. A system for training a neural network model to generate a dialogue summary, comprising:

at least one memory configured to store a similarity module and a generative language model of the neural network model; and at least one processor coupled to the at least one memory and configured to:

divide, using a similarity module executing on a processor, a dialogue conversation history into dialogue segments, wherein to divide the dialogue conversation history into the dialogue segments, the at least one processor is further configured to:

match, using the similarity module, a plurality of dialogue segments in a dialogue conversation history against segment summaries associated with a training summary, wherein that matching generates similarity scores;

select the dialogue segments from the plurality of dialogue segments that correspond to highest similarity scores from the similarity scores, wherein a dialogue segment in the selected dialogue segments includes at least one dialogue turn from dialogue turns in the dialogue conversation history;

divide, using the similarity module, the training summary into training segment summaries based on dialogue turns in the dialogue conversation history, wherein the training summary summarizes the dialogue conversation history;

generate a summary draft from the dialogue segments in a dialogue conversation history and the training segment summaries, wherein the summary draft includes turn indexes corresponding to the dialogue turns, labels for action categories and key phrases associated with a subset of the dialogue turns;

generate, using an encoder of a generative language model, encodings from the dialogue segments; and generate, using a decoder of the generative language model, segment summaries for the dialogue conversation history from the encodings from the dialogue segments and the summary draft.

12. The system of claim 11, wherein the summary draft includes a first turn index, a label for an action category in the labels for the action categories and a key phrase in the key phrases that correspond to a first dialogue turn.

13. The system of claim 11, wherein the summary draft is a concatenation of a first turn index corresponding to a first dialogue turn in the dialogue conversation history, a first label for a first action category in the labels for the action categories that corresponds to the first turn index, a first key phrase in the key phrases that corresponds to the first turn index, a second turn index corresponding to a second dialogue turn in the dialogue turns, a second label for a second action category in the labels for the action categories that corresponds to the second turn index, and a second key phrase in the second key phrases that corresponds to the second turn index.

14. The system of claim 11, wherein to generate the summary draft, the processor is further configured to:
generate, using a label module stored in the at least one memory, at least one label for the action category in the labels for the action categories from the dialogue conversation history.

15. The system of claim 11, wherein the processor is further configured to:
generate, using a parser stored in the at least one memory, at least one key phrase in the key phrases associated with the subset of the dialogue turns and a training summary draft.

16. The system of claim 11, wherein to divide the dialogue conversation history into the dialogue segments, the processor is further configured to:
separate the dialogue turns in the dialogue conversation history with separator tokens;
classify, using a dialogue turn level classifier, the separator tokens, wherein an output of the dialogue turn level classifier are token vectors representing the separator tokens;
determine probabilities of the token vectors;
select at least one token vector from the token vectors based on at least one probability in the probabilities;
identify at least one separator token corresponding to the at least one token vector as at least one cutting point that separates the dialogue segments in the dialogue conversation history; and
insert at least one highlighting token in place of the at least one separator token.

17. The system of claim 11, further comprising:
identify, using a dialogue turn level classifier and the dialogue segments, cutting points in the dialogue conversation history, wherein one cutting point from the cutting points indicates a beginning of a dialogue segment in the dialogue segments and a second cutting point indicates an end of the dialogue segment.

18. A non-transitory computer readable medium storing instructions thereon, that when executed by a processor cause the processor to perform operations for training a neural network model to generate a dialogue summary, the operations comprising:
dividing, using a similarity module executing on a processor, a dialogue conversation history into dialogue segments, a dialogue segment including at least one dialogue turn from dialogue turns in the dialogue conversation history, wherein dividing the dialogue conversation history into the dialogue segments further comprises:
separating the dialogue turns in the dialogue conversation history with separator tokens;
classifying, using a dialogue turn level classifier, the separator tokens, wherein an output of the dialogue turn level classifier are token vectors representing the separator tokens;
determining probabilities of the token vectors;
selecting at least one token vector from the token vectors based on at least one probability in the probabilities;
identifying at least one separator token corresponding to the at least one token vector as at least one cutting point that separates the dialogue segments in the dialogue conversation history; and
inserting at least one highlighting token in place of the at least one separator token;
dividing, using the similarity module, a training summary into training segment summaries based on dialogue turns in the dialogue conversation history, wherein the training summary summarizes the dialogue conversation history;
generating a summary draft from the dialogue segments in a dialogue conversation history and the training segment summaries, wherein the summary draft includes turn indexes corresponding to the dialogue turns, labels for action categories and key phrases associated with a subset of the dialogue turns;
generating, using an encoder of a generative language model, encodings from the dialogue segments; and
generating, using a decoder of the generative language model, segment summaries for the dialogue conversation history from the encodings from the dialogue segments and the summary draft.

19. The non-transitory computer readable medium of claim 18, wherein a label for an action category in the labels for the action categories is one of interrogative pronouns associated with a dialogue turn in the dialogue turns.

20. The non-transitory computer readable medium of claim 18, the operations further comprise:
generating, using a parser, at least one key phrase in the key phrases associated with the subset of the dialogue turns and a training summary draft.

* * * * *